United States Patent [19]
Toth

[11] Patent Number: 5,315,294
[45] Date of Patent: May 24, 1994

[54] FLUID METERING VERIFICATION SYSTEM

[75] Inventor: Andrew S. Toth, Mississauga, Canada

[73] Assignee: Metex Corporation Limited, Weston, Canada

[21] Appl. No.: 978,417

[22] Filed: Nov. 18, 1992

[51] Int. Cl.$^5$ .............................................. G08B 21/00
[52] U.S. Cl. ................... 340/679; 340/606; 340/608; 340/611; 417/63
[58] Field of Search .............. 340/611, 608, 606, 679; 417/63

[56] References Cited
U.S. PATENT DOCUMENTS

| | | | |
|---|---|---|---|
| 4,007,755 | 2/1977 | Lerner et al. | 137/101.21 |
| 4,142,539 | 3/1979 | Shih et al. | 134/113 |
| 4,947,153 | 8/1990 | Berger | 340/608 |
| 5,133,391 | 7/1992 | Johansson | 141/1 |
| 5,237,310 | 8/1993 | Smith | 340/608 |

Primary Examiner—Glen R. Swann, III
Attorney, Agent, or Firm—Ridout & Maybee

[57] ABSTRACT

A positive verification of fluid flow from a reservoir through a metering pump is provided by monitoring the downstream fluid pressure fluctuations caused in the fluid conduit by inserting a pressure sustaining valve in it. A pressure switch or similar device coacts with a pulse timer to monitor the periodic pressure fluctuations in the conduit. A lapse in the periodic pressure fluctuations for a specified time allows the timer to activate an alarm signal.

4 Claims, 1 Drawing Sheet

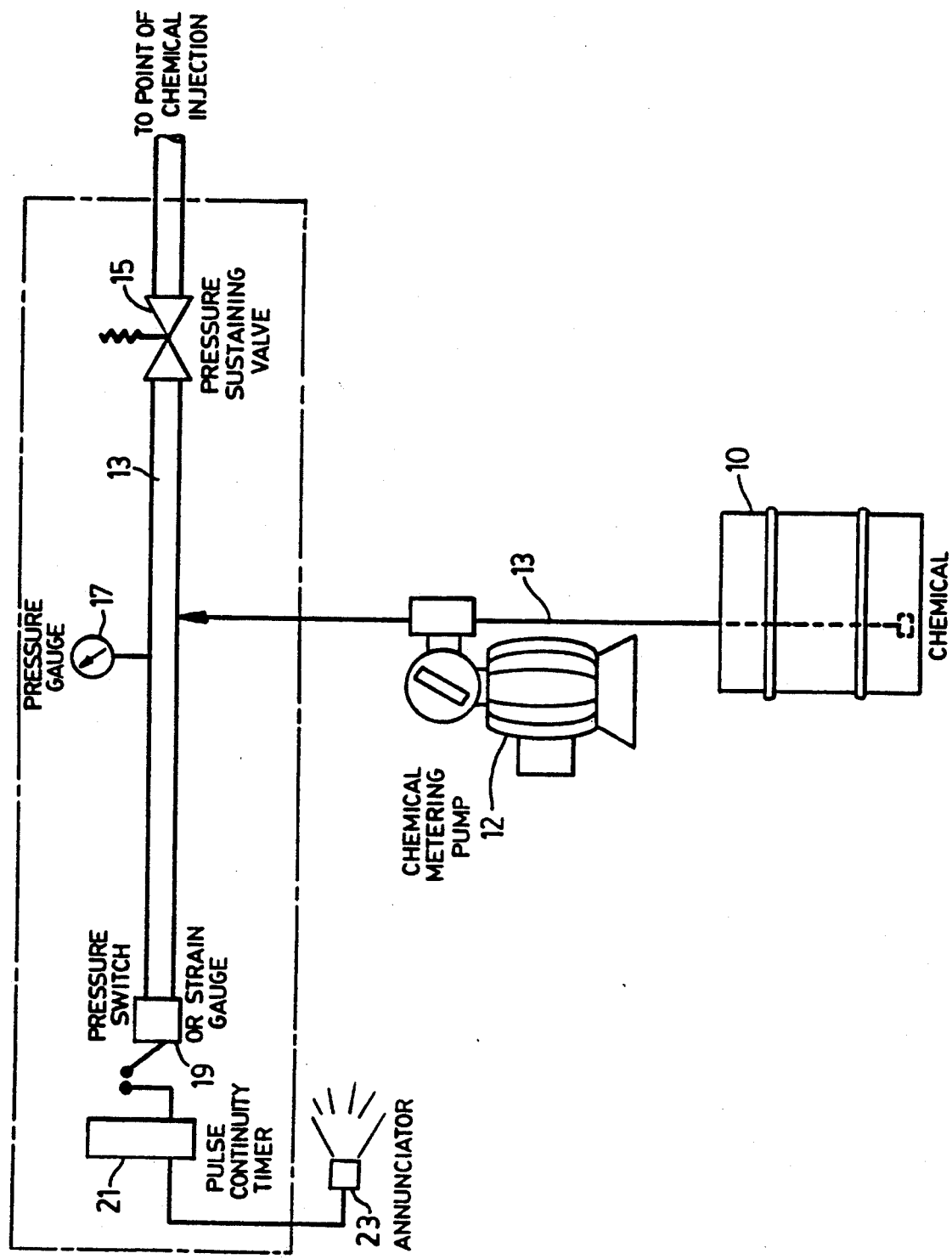

FLUID METERING VERIFICATION SYSTEM

The invention is a fluid metering verification system. In process applications where it is essential that a fluid be periodically or continuously injected into the process system, the invention provides a means for positive verification that the fluid injection has occurred.

Many industrial processes call for the periodic or continuous injection of discrete quantities of a fluid additive or chemical into the process. Such fluids are metered into the process by using metering pumps which transfer the fluids from reservoirs into the system in accordance with adjustable pulse rates and stroke lengths for such pumps.

There are many ways in which this metering of a process fluid from a reservoir into a process can go astray. The reservoir can be pumped dry, the pump may lose its prime or may break down, or the fluid conduit may develop a leak, to mention a few such possible system failures. Since opaque pipes are commonly used in such systems, it is not possible to visually verify if a process fluid is indeed being metered into the system. An operating pump is no guarantee that the process fluid is in fact being metered into the system. Clearly, the failure to inject a process fluid into a system can lead to serious and costly damage.

The invention addresses this problem by making use of the fact that the discharge of a fluid by the pump causes a pressure increase in the fluid conduit downstream of the pump. By monitoring the opening and closing of a pressure sustaining valve in the conduit downstream of the pump, the movement of fluid through the conduit in response to the action of the pump can be verified.

Accordingly, the invention provides a fluid metering verification system, comprising a fluid metering pump operable to meter a plurality of discrete quantities of a fluid from a fluid reservoir through a fluid conduit to a discharge site. A pressure sustaining valve is located in the fluid conduit downstream of the fluid pump. The valve is adjustable to open at a desired threshold pressure and to close when the pressure falls below the threshold level. Pressure monitoring means are located in the conduit downstream of the pump and upstream of the valve to sense periodic pressure increases in the conduit corresponding to the opening and closing of the valve. A signal is produced by the monitoring means if the periodic pressure increases stop for a specified time.

BRIEF DESCRIPTION OF THE DRAWING

The figure is a schematic diagram of a preferred embodiment of the invention.

A preferred embodiment of the invention will be described in relation to the injection of a liquid chemical from a drum into a process system using a metering pump. The skilled person will appreciate the general applicability of the invention from the following particular description.

As shown in the figure, a liquid chemical or chemical solution is contained in a reservoir, such as a drum 10. A liquid metering pump 12 is provided in a conduit 13 extending from the drum 10 to the discharge site for the liquid. The pump 12 may be of any of a number of types currently known and used for the purpose. Typically, the pump 12 has an adjustable pumping cycle capable of providing pump strokes over a fairly wide range of time intervals, e.g. 1-120 strokes/min.

A pressure sustaining valve 15 is provided in the conduit 13 downstream of the pump 12. The valve 15 is adjustable to open at a desired threshold fluid pressure and to close when the pressure level upstream of the valve 15 falls below the threshold. It is preferable to include a pressure gauge 17 in the conduit 13 downstream of the pump 12 and upstream of the valve 15 to provide a visual indication of the pressure in the conduit 13 and to assist in setting the threshold level for the valve 15. The opening and closing of the valve 15 causes a periodic pressure fluctuation in the conduit 13 downstream of the pump 12 and upstream of the valve 15. The pressure fluctuation is a positive indication that fluid is being pumped by the pump 12 from the drum 10 through the valve 15.

The periodic pressure fluctuation in the conduit 13 is monitored by pressure monitoring means. As shown in FIG. 1, a preferred pressure monitoring means comprises a pressure activated switch 19 located in the conduit 13 upstream of the valve 15 and downstream of the pump 12. The pressure switch 19 is set to trip at the threshold pressure of the valve 15. The switch 19 is connected to a pulse continuity timer 21 which is set to correspond with the pulse cycle interval of the pump 12 or to some longer interval. The timer 21 is connected to an alarm signal 23. Failure of the pressure switch 19 to reset the timer 21 within the interval set for the timer 21 causes the completion of the circuit activating the alarm signal 23. Thus, the activation of the alarm signal 23 provides a rapid indication of the failure of the fluid metering system, and rapid remedial action can be taken.

The skilled person will appreciate that various equivalents can be used in the combination of the invention. For example, a strain gauge may be substituted for the pressure switch 19, and several types of chemical metering pumps may be used, such as diaphragm, piston etc., having variable stroke lengths or pulse frequencies, or both. The scope of protection for the invention being sought is specified particularly in the following claims.

I claim:

1. A fluid metering verification system, comprising:
   a fluid metering pump operable to meter a plurality of discrete quantities of a fluid from a fluid reservoir through a fluid conduit to a discharge site;
   a pressure sustaining valve in the fluid conduit downstream of the fluid pump, the valve being adjustable to open at a desired threshold upstream fluid pressure and to close when the fluid pressure falls below the threshold level; and
   pressure monitoring means in the fluid conduit downstream of the pump and upstream of the valve, the pressure monitoring means sensing periodic fluid pressure increases in the conduit corresponding to the periodic opening and closing of the valve and producing a signal if the periodic pressure increases stop for a specified time.

2. A system as claimed in claim 1, further comprising a pressure gauge in the conduit downstream of the pump and upstream of the valve.

3. A system as claimed in claim 1, wherein the pressure monitoring means comprises an event timer connected to the alarm signal so that the signal is activated when a specified interval elapses between events, and a pressure switch connected to the timer, the switch being activated to record an event on the timer in response to specified pressure fluctuations in the conduit downstream of the pump and upstream of the valve.

4. A system as claimed in claim 1, wherein the pressure monitoring means comprises an event timer connected to an alarm signal so that the signal is activated when a specified interval elapses between the events, and a strain gauge connected to the timer, the gauge being activated to record an event on the timer in response to specified pressure fluctuations in the conduit downstream of the pump and upstream of the valve.

* * * * *